US011544589B2

(12) United States Patent
Dinh et al.

(10) Patent No.: US 11,544,589 B2
(45) Date of Patent: Jan. 3, 2023

(54) USE MACHINE LEARNING TO VERIFY AND MODIFY A SPECIFICATION OF AN INTEGRATION INTERFACE FOR A SOFTWARE MODULE

(71) Applicant: Dell Products L. P., Round Rock, TX (US)

(72) Inventors: Hung The Dinh, Austin, TX (US); Pallavi Jaini, Shrewsbury, MA (US); Akanksha Bansal, Bangalore (IN); Sharath Kumar Mudigere Yathiraj, Shrewsbury, MA (US); Abhijit Mishra, Bangalore (IN); Sabu Syed, Austin, TX (US); Amirthraj Ramakrishnan, Austin, TX (US); Tousif Mohammed, Bangalore (IN); Jatin Kamlesh Thakkar, Bangalore (IN); Vijaya P. Sekhar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 866 days.

(21) Appl. No.: 16/427,436

(22) Filed: May 31, 2019

(65) Prior Publication Data

US 2020/0380386 A1    Dec. 3, 2020

(51) Int. Cl.
*G06N 5/04*    (2006.01)
*G06N 20/00*    (2019.01)
*G06F 9/54*    (2006.01)

(52) U.S. Cl.
CPC ............... *G06N 5/04* (2013.01); *G06F 9/54* (2013.01); *G06N 20/00* (2019.01)

(58) Field of Classification Search
CPC ............ G06N 5/04; G06N 20/00; G06F 9/54
USPC .......................................................... 706/11
See application file for complete search history.

(56) References Cited

U.S. PATENT DOCUMENTS

| 2018/0025289 A1* | 1/2018 | Doshi ............... G06N 20/00 706/12 |
| 2018/0173730 A1* | 6/2018 | Copenhaver ......... G06F 16/212 |
| 2018/0181451 A1* | 6/2018 | Saxena .................. G06F 9/545 |

* cited by examiner

*Primary Examiner* — Hermon Asres
(74) *Attorney, Agent, or Firm* — Krishnendu Gupta; Deepika Bhayana; Derek Lam

(57) ABSTRACT

In some examples, a server may determine a specification associated with a software module that is to be integrated with a software system. The specification identifies how the software module interacts with the software system. The server may execute a machine learning module to perform an analysis of the specification. The machine learning module may suggest at least one modification to at least a first portion of the specification and may automatically modify at least a second portion of the specification. The server may convert the specification to one or more application programming interface (API) calls and provide a system interface that includes the one or more API calls to enable the software module to interact with the software system. The API calls may include calls to a data integration API, a file transfer API, a messaging API, a database API, or any combination thereof.

20 Claims, 3 Drawing Sheets

USE MACHINE LEARNING TO VERIFY AND MODIFY A SPECIFICATION OF AN INTEGRATION INTERFACE FOR A SOFTWARE MODULE

BACKGROUND OF THE INVENTION

Field of the Invention

This invention relates generally to integrating a software module with an existing software system and more specifically to automatically (e.g., without human interaction) verifying and modifying, based on machine learning, a specification of an integration interface and automatically creating the integration interface.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

With large software systems, integrating a software module with the existing software can be a difficult task. First, the creator of the software module may not fully understand the various application programming interfaces (APIs) and how to integrate with them. Second, the creator of the software module may not specify parameters to the APIs that are appropriate for the tasks being performed. For example, the software module may allocate a message queue with a queue depth that is either too large or too small for the tasks being performed, causing wasted space (too large) or frequent queue overflow (too small). Third, if the software module behaves badly, e.g., by allocating too much or too little space and the like, the software module may cause the entire system to crash. Thus,

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a server may determine a specification associated with a software module that is to be integrated with a software system. The specification identifies how the software module interacts with the software system. The server may execute a machine learning module to perform an analysis of the specification. The machine learning module may suggest at least one modification to at least a first portion of the specification and may automatically modify at least a second portion of the specification. The server may convert the specification to one or more application programming interface (API) calls and provide a system interface that includes the one or more API calls to enable the software module to interact with the software system. The API calls may include calls to a data integration API, a file transfer API, a messaging API, a database API, or any combination thereof.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
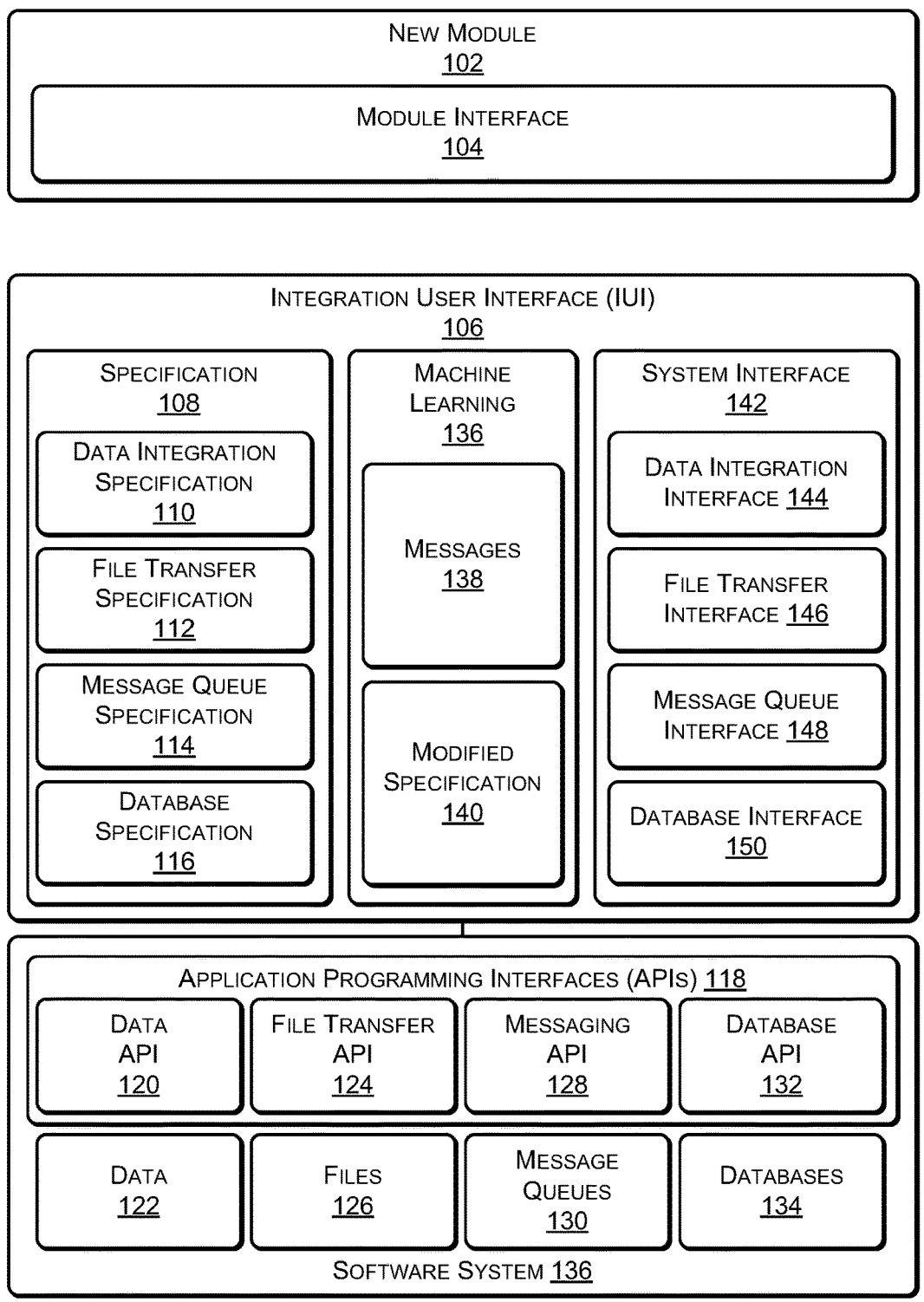
FIG. 1 is a block diagram of a system that includes a new module and an integration user interface, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein enable a user (e.g., a software designer) to quickly and easily integrate a software module (e.g., authored by the user) into an existing software system. In some cases, the user may provide a specification to an integration user interface (IUI) and the IUI may automatically generate an integration interface that provides the software module with an appropriate integration interface to enable the software module to work with the various components of the existing software system. In other cases, the IUI may provide a wizard that asks the user various questions to determine information about the software module after which the IUI automatically generates an integration interface that provides the software module with an integration interface to enable the software module to integrate with the existing software system. For example, the integration interface may include calls to one or more application programming interfaces (APIs) to enable the software module to interact with the software system, such as, to perform data integration, file transfer, message queuing, database access, and the like.

A machine learning module that has been trained using historical data may check the specification of the integration interface. The machine learning module may provide one or more suggestions, such as, for example "Consider increasing the size of the message queue from X to at least Y (X, Y>0, X specified by the user) to avoid the message queue filling up during high traffic situations." The machine learning module may automatically modify one or more portions of the specification to create a modified specification. The IUI may use the modified specification (rather than the user specified specification) to create the integration interface. In this way, the specification may be adjusted to reduce situations where (i) the user doesn't allocate enough of a particular resource (e.g., setting up the possibility that under certain situations the particular resource may be unavailable) or (ii) the user over-allocates a particular resource (e.g., wasting the particular resource). Thus, the machine learning module may automatically readjust the specification (e.g., based on historical data) to enable the software module to interact with the existing software system, reducing mistakes that someone who is not familiar with the system (or not familiar with some portions of the system) might make.

In a conventional system, the process of integrating a new module with a software system is largely a manual process. For example, in a conventional system, a user may create the new module and then create and submit a specification. A system administrator associated with the system may manually review the specification and determine if the requested interface can be provided. If the requested interface cannot be provided, the system administrator may deny the request and the user may (i) modify the new module, (ii) create and submit a new specification, or both. This process may be repeated until the system administrator approves the request. After the system administrator approves the request, the system administrator may manually code the system interface by incorporating (e.g., based on the specification) the appropriate API calls. Thus, in a conventional system, a system administrator may manually review the specification and manually create the system interface, which are both labor intensive tasks. In contrast, the systems and techniques described herein automate the review of the specification and creating the system interface. In addition, the machine learning component modifies and/or suggests modifications to the specification to reduce (or prevent) under-provisioning or over-provisioning of resources. For example, under-provisioning a message queue, a database, or the like may cause delays during runtime if the message queue or the database becomes full (or reaches another boundary condition). Over-provisioning a message queue, a database, or the like may result in wasting shared resources (e.g., computing resources of the software system).

For example, a computing device may include one or more processors and one or more non-transitory computer-readable storage media to store instructions executable by the one or more processors to perform various operations. The operations may include, for example, determining a specification associated with a software module that is to be integrated with a software system. The specification may identify how the software module interacts with the software system. For example, determining the specification associated with the software module may include displaying a plurality of fields to be filled in, using a wizard to ask multiple questions and receive a corresponding answer for each question, retrieve a specification document, or any combination thereof. The operations may include performing, using a machine learning module (e.g., trained using historical data), an analysis of the specification and modifying at least one portion of the specification to create a modified specification. The machine learning module may determine that the at least one portion of the specification is under-provisioned and may modify the specification to increase a provisioning of a resource. As another example, the machine learning module may determine that the at least one portion of the specification is over-provisioned and may modify the specification by reduce a provisioning of a resource. The machine learning module may predict a value for the at least one portion of the specification, determine that a specified value in the specification differs from the predicted value by more than a predetermined percentage, and modify the specified value in the specification to the predicted value to create the modified specification. In some cases, based on the analysis, the machine learning module may provide at least one suggestion to modify a second portion of the specification. The operations may include converting the modified specification to one or more application programming interface (API) calls and providing a system interface comprising the one or more API calls to enable the software module to interact with the software system. The one or more API calls may include at least one call to: a data integration API, a file transfer API, a message queue API, a database API, or another system-related API.

FIG. 1 is a block diagram of a system 100 that includes a new module and an integration user interface, according to some embodiments. The system 100 may include a new module 102 (e.g., software module) that is being integrated with a software system 136. For example, the new module 102 may implement new functionality not currently available using the software system 136. The new module 102 may include a module interface 104 to interface with the software system 136. For example, the new module 102 may use the module interface 104 to read data from and write data to the software system 136, transfer files to and from the software system 136, send messages to and receive messages from various modules of the software system 136, access (e.g., read from and write to) one or more databases of the software system 136, other interactions with components of the software system 136, and the like.

The module interface 104 may interact with the software system 136 using a system interface 142. An integration user interface (IUI) 106 may create the system interface 142 based on a specification 108 provided by a user (e.g., a software developer associated with the new module 102). Thus, the system interface 142 may be a custom interface created by the IUI 106 specifically for the usage of the new module 102. For example, the user may provide the specification 108 by filling in fields in a form displayed on a web browser by the IUI 106. To illustrate, the IUI 106 may ask the user to specify (i) a data integration specification 110 specifying the data in the software system 136 accessed by the new module 102, (ii) a file transfer specification 112 specifying the types and sizes of files being transferred between the software system 136 and the new module 102, (iii) a message queue specification 114 specifying the types and sizes of messages and message queues in the software system 136 being accessed by the new module 102, (iv) a database specification 116 specifying the databases in the software system 136 being accessed by the new module 102, and (v) other components of the software system 136 accessed by the new module 102. In some cases, the IUI 106 may provide a wizard that asks the user questions to determine the specification 108 while in other cases, the user may provide the specification 108 in the form of a file (e.g., a document). The IUI 106 may use the specification 108 to create the system interface 142.

The IUI 106 may analyze the specification 108 and automatically convert the specification 108 into calls to one or more application programming interfaces (APIs) 118. For example, the IUI 106 may use the data integration specification 110 to create a data integration interface 144 in the system interface 142 that uses at least one data API 120 to access (e.g., read and/or write) data 122 in the software system 136. The IUI 106 may use the file transfer specification 112 to create a file transfer interface 146 in the system interface 142 that uses at least one file transfer API 124 to access (e.g., read and/or write) files 126 in the software system 136. The IUI 106 may use the message queue specification 114 to create a message queue interface 148 in the system interface 142 that uses at least one messaging API 128 to access (e.g., read and/or write) messages to one or more message queues 130 in the software system 136. The IUI 106 may use the database specification 116 to create a database interface 150 in the system interface 142 that uses at least one database API 132 to access (e.g., read and/or write) to one or more databases 134 in the software system 136.

A machine learning module 136 that has been trained using historical data may analyze the specification 108 before the IUI 106 uses the specification 108 to create the system interface 142. For example, the message queue specification 114 may specify a particular queue size, a particular message size, and the like. The machine learning 136 may analyze the message queue specification 114 and determine that the queue size, message size, or other portion of the message queue specification 114 is predicted to be either (i) too small (e.g., resulting in lost messages or extended wait times or (ii) too large (e.g., waste of resources). The machine learning module 136 may, after analyzing the specification 108, display one or more messages 138 with suggestions on modifying the specification 108, e.g., "consider modifying the message queue size from X to Y because X is predicted to be too small/large and may result in the following issues . . . ". The machine learning module 136 may, after analyzing the specification 108, automatically modify the specification 108 to create a modified specification 140 in which one or more of the specifications 110, 112, 114, or 116 have been modified based on the predicted values. For example, if the difference between the specification 108 and a predicted value is less than a threshold amount (e.g., less than 10%, 5%, or the like) then the machine learning 136 may provide one of the messages 138 with a suggestion. If the difference between the specification 108 and a predicted value is at least (e.g., greater than or equal to) the threshold amount (e.g., at least 10%, 5%, or the like) then the machine learning 136 may automatically modify at least a portion of the specification 108 to create the modified specification 140. For example, based on the specification 108, the machine learning 136 may predict that one of the message queues 130 should have a size (e.g., queue depth) of one hundred. Assume the threshold is set to 10% (e.g., set by a system administrator). If the message queue specification 114 specifies a size of between 91 to 99 or 101 to 109, then the machine learning 136 may display one of the messages 138 suggesting that the message queue specification 114 be changed to specify a depth of one hundred. If the message queue specification 114 specifies a size of ninety or less, then the machine learning 136 may automatically modify the specification 108 to create the modified specification 140 that specifies a depth of one hundred, thereby reducing the possibility that the message queue will become full when being used. If the message queue specification 114 specifies a size of one hundred and ten or more, then the machine learning 136 may automatically modify the specification 108 to create the modified specification 140 that specifies a depth of one hundred, thereby reducing wasting resources by over allocating the size of the message queue. In this way, the machine learning 136 may automatically modify or make suggestions to modify portions of the specification to reduce the possibility of runtime errors due to a user under provisioning a resource and reduce wasting resources due to a user over provisioning a resource. The IUI 106 may analyze the specification 108, the modified specification 140, or both and automatically convert the specification 108 and/or the modified specification 140 into calls to one or more of the APIs 118.

At least one of the message queues 130 may be used by the new module 102 to communicate with a particular module of the software system 136. For example, the new module 102 may place a message in the message queue and the particular module may retrieve the message and perform one or more actions based on the message. The particular module may place a second message in the message queue and the new module 102 may retrieve the second message and perform one or more additional actions based on the second message. The file transfer API 124 may use managed file transfer or similar to transfer files. The machine learning 136 may predict the number of files to be transferred and modify the specification 108 accordingly. The data API 120 may access a Global Data Integration (GDI) portion of the software system 136, the file transfer API 124 may access a Managed File Transfer (MFT) 136, IBM® DataPower or the like portion of the software system 136, the messaging API 128 may access a message queuing portion of the software system 136, and the database API 132 may access a service oriented architecture (SOA) of a database (e.g., Oracle®, Mongo®, or the like). The machine learning module 136 may provide predictive risk-check for message queue integration builds. The IUI 106 may be integrated with a single sign on (SSO) service for automatic user registration on first time use of a message queue. The IUI 106 may present users with options to select a particular technology. Based on the particular technology, the user can deploy, promote, retrofit a work order on a target environment with a few selections. The IUI 106 may provide the user with options to select a source application and a destination application that are to be integrated because both use the message queue to communicate with each other. The IUI 106 may programmatically retrieve the specified environment data, such as the queue manager (Qmgr), Hostname, Port, Channel, and Authorities. The machine learning 136 may be trained using N-days (N=30, 60, 90 or the like) of profiling active message queue instances through a percentage of queue depth (QDepth) utilized across time. Linear relations may be used to determine potential deviations in utilized queue depth. For example, the user may specify a maximum queue depth and an expected daily queue depth and the machine learning module 136 may predict a percentage risk of the queue depth being insufficient. The specification 108 nay specify creating a new account and different types of integrations for various Managed File Transfer (MFT) platforms. The machine learning module 136 may perform dynamic outliner threshold revision to detect anomalies based on business context. The specification 108 may enable specifying provisioning a new account in one or more particular MFT environments, creating transfer sites and subscriptions in an MFT environment and link the sites to the subscriptions. The machine learning module 136 may dynamically monitor the interactions between the new module 102 and the software system 136 to identify outlier thresholds to capture anomalous account activity levels. For example, rolling M-week (M=4, 6, 8, or the like) activity levels may be analyzed to identify outlier or anomalous activity (e.g., reaching minimum or maximums). The IUI 106 may enable performing functions on the SOA infrastructure of the software system 136 in a self-service fashion (e.g., without a system administrator manually performing the functions), such as, for example, domain creation, domain extension, domain deletion, track creation, patching, Oracle® HTTP Server (OHS) installation and configuration, Splunk® agent installation and configuration, and the like. A request to perform an SOA function may be categorized based on work-type and may be used to automatically create a set of sub-tasks. Data may be sent to respective SOA APIs (part of the database API 132) based on the work type.

In some cases, the machine learning module 136 may monitor the interactions between the new module 102 and the system interface 142 during runtime and adjust the parameters associated with the interfaces 144, 146, 148, and 150 accordingly. For example, if the machine learning module 136 detects an anomaly in terms of the data integration, file transfer, message queues, database access, or the like, the machine learning module 136 may dynamically (e.g., in real-time), when the new module 102 is interacting with the software system 136, modify the parameters associated with the interfaces 144, 146, 148, and 150.

Thus, a user may create a software module and begin to integrate the software module with an existing software system. The software module may include a module interface to interact (e.g., send and receive data, send and receive messages, and the like) with the software system. The user may specify a specification for a system interface to enable the software module to interact with the software system. For example, the specification may specify data integration details, file transfer details, message queue details, database details, and the like. After receiving the specification from the user, an integration user interface (IUI) may automatically (e.g., without human interaction) convert the specification into a system interface that includes calls to various application programming interfaces (APIs) in the software system. For example, the system interface may include calls to a data API, a file transfer API, a messaging API, a database API, and the like. A machine learning module that has been trained using historical data may analyze the specification and predict whether portions of the specification may be under-provisioned (e.g., causing delays when a resource becomes temporarily unavailable) or over-provisioned (e.g., under-utilizing and wasting resources). For example, the machine learning may predict whether the data integration, the file transfer, the message queueing, the database access, and the like are under-provisioned or over-provisioned. The machine learning module may automatically modify portions of the specification, provide suggestions to the user to modify portions of the specification, or both. The IUI may use the modified portions of the specification (rather than the original specification) when converting the specification to create the system interface. In this way, a software programmer that makes one or more errors (e.g., a typographical error or an error due to not understanding the workings of the software system) may have the errors automatically corrected. In addition, the IUI automatically converts the specification (or the modified specification) to create a system interface with API calls, reducing or eliminating the manual process of manually checking the specification and manually creating the system interface.

Figure 2:
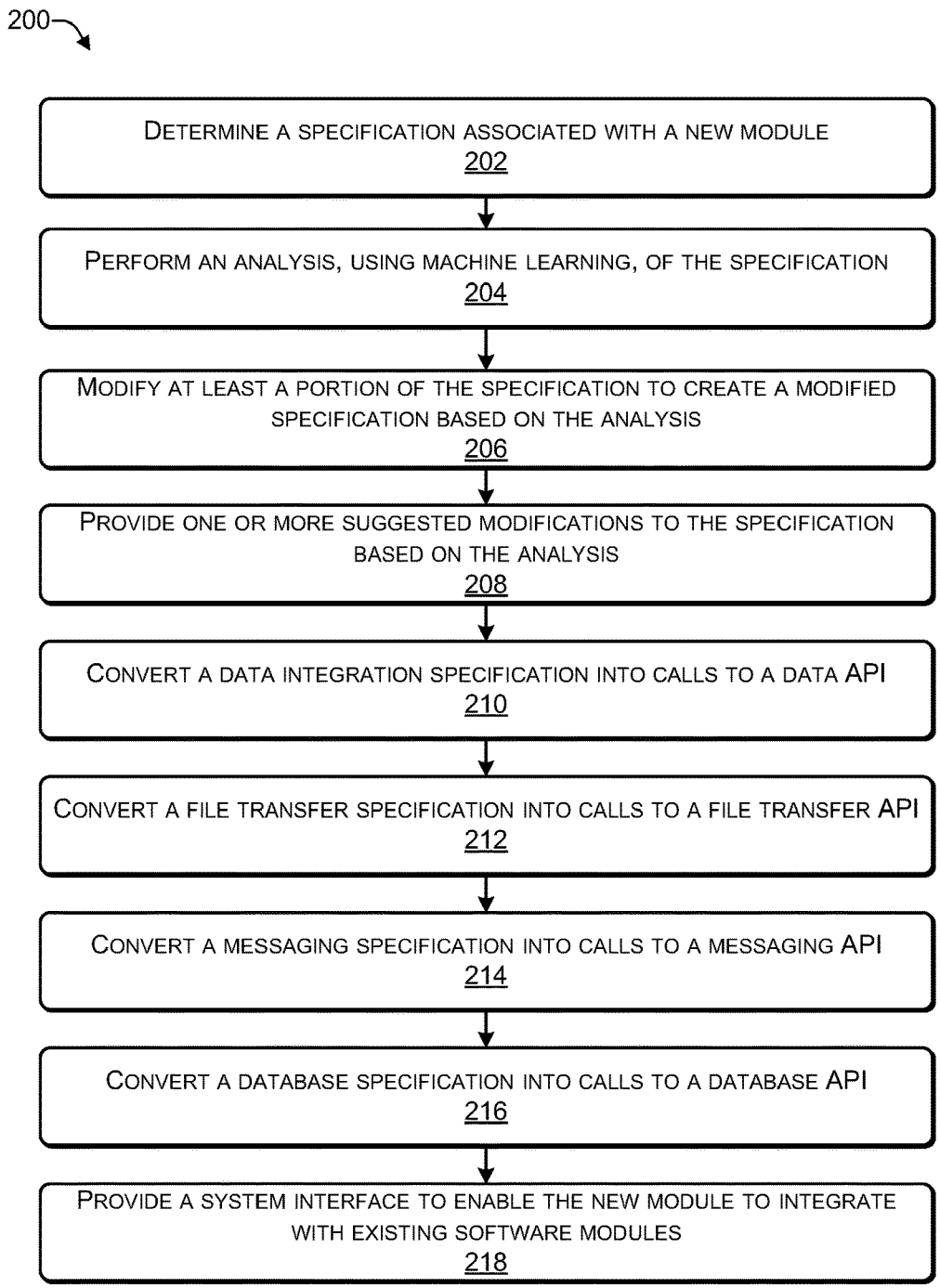
FIG. 2 is a flowchart of a process to provide a system interface, according to some embodiments.

In the flow diagram of FIG. 2, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 200, is described with reference to FIG. 1 as described above, although other models, frameworks, systems and environments may be used to implement these processes.

FIG. 2 is a flowchart of a process 200 to provide a system interface, according to some embodiments. The process 200 may be performed by, for example, the IUI 106 of FIG. 1.

At 202, the process may determine a specification associated with (e.g., an integration interface of) a new module. For example, in FIG. 1, the user may provide the specification 108 by filling in fields in a form displayed on a web browser by the IUI 106, the IUI 106 may provide a wizard that asks the user questions to determine the specification 108, or the user may provide the specification 108 in the form of a file (e.g., a document). The IUI 106 may use the specification 108 to create the system interface 142.

At 204, the process may use machine learning to perform an analysis of the specification. At 206, the process may modify, based on the analysis, at least a portion of the specification to create a modified specification. At 208, the process may provide one or more suggested modifications to the specification, based on the analysis, (which, if implemented, would create a modified specification). For example, in FIG. 1, the machine learning module 136 that has been trained using historical data may analyze the specification 108 before the IUI 106 uses the specification 108 to create the system interface 142. The machine learning module 136 may, after analyzing the specification 108, display one or more messages 138 with suggestions on modifying the specification 108, e.g., "consider modifying the message queue size from X to Y because X is predicted to be too small/large and may result in the following issues . . . ". The machine learning module 136 may, after analyzing the specification 108, automatically modify the specification 108 to create a modified specification 140 in which one or more of the specifications 110, 112, 114, or 116 have been modified based on the predicted values. In this way, the machine learning 136 may automatically modify or make suggestions to modify portions of the specification to reduce the possibility of runtime errors due to a user under provisioning a resource and reduce wasting resources due to a user over provisioning a resource.

At 210, the process may convert a data integration specification (e.g., a portion of the specification or the modified specification) into calls to at least one data API. At 212, the process may convert a file transfer specification (e.g., a portion of the specification or the modified specification) into calls to at least one file transfer API. At 214, the process may convert a messaging specification (e.g., a portion of the specification or the modified specification) into calls to at least one messaging (e.g., message queue) API. At 216, the process may convert a database specification (e.g., a portion of the specification or the modified specification) into calls to at least one database API. For example, in FIG. 1, the IUI 106 may analyze the specification 108 and automatically convert the specification 108 into calls to one or more application programming interfaces (APIs) 118. For example, the IUI 106 may use the data integration specification 110 to create a data integration interface 144 in the system interface 142 that uses at least one data API 120 to access (e.g., read and/or write) data 122 in the software system 136. The IUI 106 may use the file transfer specification 112 to create a file transfer interface 146 in the system interface 142 that uses at least one file transfer API 124 to access (e.g., read and/or write) files 126 in the software system 136. The IUI 106 may use the message queue specification 114 to create a message queue interface 148 in the system interface 142 that uses at least one messaging API 128 to access (e.g., read and/or write) messages to one or more message queues 130 in the software system 136. The IUI 106 may use the database specification 116 to create a database interface 150 in the system interface 142 that uses at least one database API 132 to access (e.g., read and/or write) to one or more databases 134 in the software system 136.

At 218, the process may provide a system interface to enable the new module to integrate with existing software modules (e.g., of a software system). Thus, the system interface 142 may be a custom interface created by the IUI 106 specifically for the new module 102 to interact with software modules of the software system 136.

Thus, a user may provide a specification that specifies how a software module is to interact with an existing software system. A machine learning module may analyze the specification to determine whether the various components of the specification are predicted to cause, based on historical data, potential issues. For example, the specification may indicate a particular level of throughput for data, files, messages, or contents of a database. The machine learning module may predict, based on historical data, that the throughput is unlikely to be achieved because particular resources are being incorrectly provisioned. For example, under-provisioning a queue size, a database size, a file size or number of files, data size or number of data items, or the like may cause delays during runtime when the under-provisioned resource approaches a maximum utilization of the resource. Over-provisioning a queue size, a database size, a file size or number of files, data size or number of data items, or the like may cause resources to be wasted, thereby potentially causing issues for other software modules. The machine learning module may predict which particular portions of the specification may cause issues and automatically modify the particular portions to create a modified specification. For example, the machine learning module may predict, based on historical data, a particular queue size, a particular database size, a particular file size or a particular number of files, a particular data size or a particular number of data items, or the like that is likely not to under-provision or over-provision particular resources. If particular portions of the specification are within a predetermined threshold from a value predicted to strike a balance between over-provisioned and under-provisioned, the machine learning module may provide suggestions to the user rather than automatically modifying the particular portions. Thus, the machine learning module may automatically modify some portions of the specification while suggesting changes to other portions of the specification. Thus, the entire process of integrating a new module with a software system may be automated, reducing or eliminating the manual process of checking if the specification can be provided and manually creating an interface based on the specification that provides the requested access to the software system.

Figure 3:
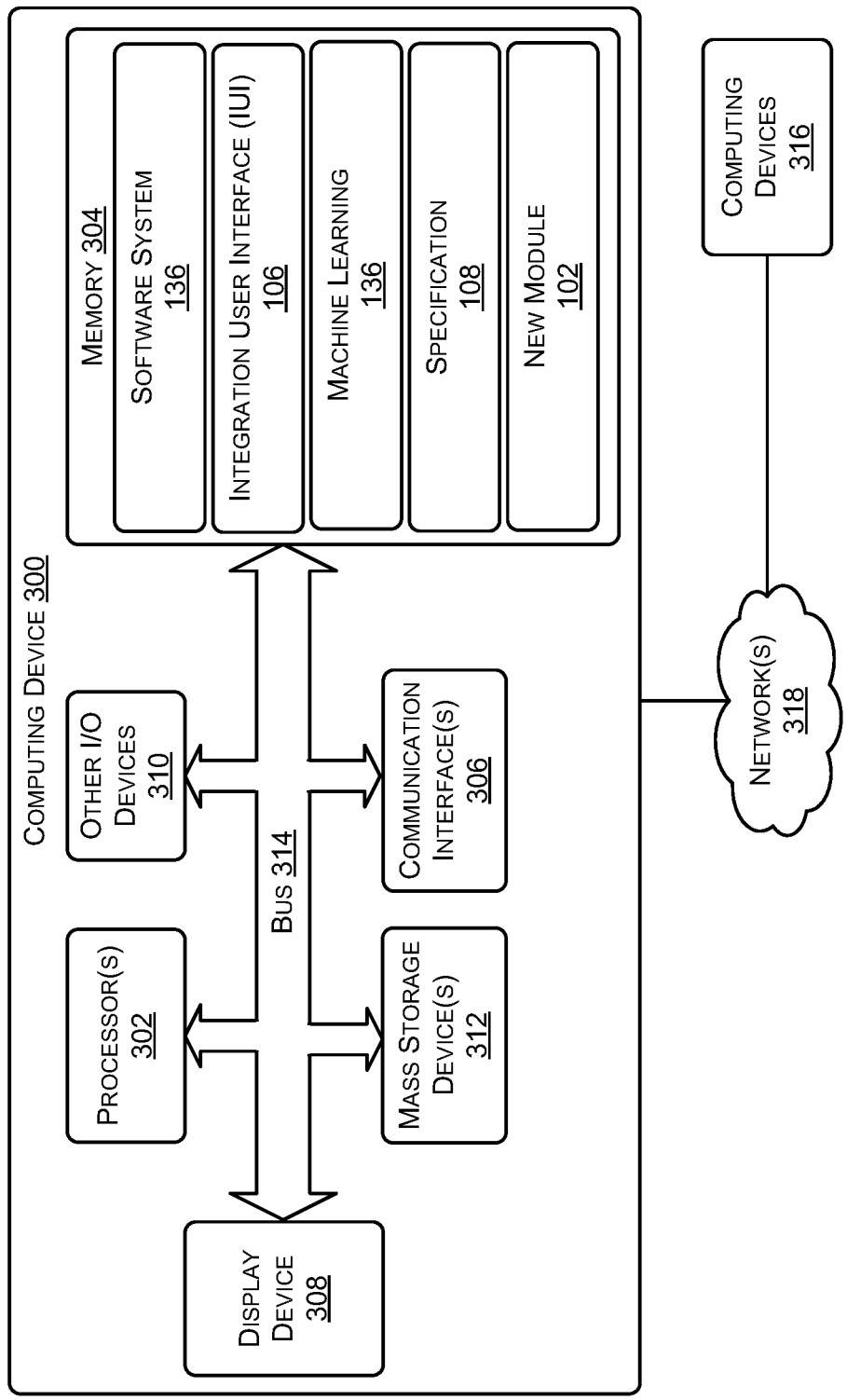
FIG. 3 illustrates an example configuration of a computing device that can be used to implement the systems and techniques described herein.

FIG. 3 illustrates an example configuration of a computing device 300 that can be used to implement the computing device 100. The computing device 300 may include one or more processors 302 (e.g., CPU, GPU, or the like), a memory 304, communication interfaces 306, a display device 308, other input/output (I/O) devices 310 (e.g., keyboard, trackball, and the like), and one or more mass storage devices 312 (e.g., disk drive, solid state disk drive, or the like), configured to communicate with each other, such as via one or more system buses 314 or other suitable connections. While a single system bus 314 is illustrated for ease of understanding, it should be understood that the system buses 314 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 302 are one or more hardware devices that may include a single processing unit or a number of processing units, all of which may include single or multiple computing units or multiple cores. The processors 302 may include a graphics processing unit (GPU) that is integrated into the CPU or the GPU may be a separate processor device from the CPU. The processors 302 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 302 may be configured to fetch and execute computer-readable instructions stored in the memory 304, mass storage devices 312, or other computer-readable media.

Memory 304 and mass storage devices 312 are examples of computer storage media (e.g., memory storage devices) for storing instructions that can be executed by the processors 302 to perform the various functions described herein. For example, memory 304 may include both volatile memory and non-volatile memory (e.g., RAM, ROM, or the like) devices. Further, mass storage devices 312 may include hard disk drives, solid-state drives, removable media, including external and removable drives, memory cards, flash memory, floppy disks, optical disks (e.g., CD, DVD), a storage array, a network attached storage, a storage area network, or the like. Both memory 304 and mass storage devices 312 may be collectively referred to as memory or computer storage media herein and may be any type of non-transitory media capable of storing computer-readable, processor-executable program instructions as computer program code that can be executed by the processors 302 as a particular machine configured for carrying out the operations and functions described in the implementations herein.

The computing device 300 may include one or more communication interfaces 306 for exchanging data via the network 106. The communication interfaces 306 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 306 can also provide communication with external storage, such as a storage array, network attached storage, storage area network, cloud storage, or the like. The communication interfaces 306 may enable the computing device 300 to communication with other computing devices 316 via one or more networks 318.

The display device 308 may be used for displaying content (e.g., information and images) to users. Other I/O devices 310 may be devices that receive various inputs from a user and provide various outputs to the user, and may include a keyboard, a touchpad, a mouse, a printer, audio input/output devices, and so forth. The computer storage media, such as memory 304 and mass storage devices 312, may be used to store software and data, such as, for example, the software system 136, the IUI 106, and the new module 102.

Thus, a user may create the new module 102 and begin to integrate the new module 102 with an existing software system, such as the software system 136. The new module 102 may include a module interface to interact (e.g., send and receive data, send and receive messages, and the like) with the software system 136. The user may provide the specification 108 to enable the new module 102 to interact with the software system 136. For example, the specification 108 may specify data integration details, file transfer details, message queue details, database details, and the like. After receiving the specification 108 from the user, the IUI 106 may automatically (e.g., without human interaction) convert the specification 108 into a system interface that includes calls to various application programming interfaces (APIs) in the software system 136. For example, the system interface may include calls to a data API, a file transfer API, a messaging API, a database API, and the like. The machine learning module 136 that has been trained using historical data may analyze the specification 108 and predict whether portions of the specification 108 may be under-provisioned (e.g., causing delays when a resource becomes temporarily unavailable) or over-provisioned (e.g., under-utilizing and wasting resources). For example, the machine learning 136 may predict whether the data integration, the file transfer, the message queueing, the database access, and the like are under-provisioned or over-provisioned. The machine learning module 136 may automatically modify portions of the specification 108 that are predicted to not cause runtime issues, provide suggestions to the user to modify portions of the specification 108, or both. The IUI 106 may use the modified portions of the specification (rather than the original specification) 108 when converting the specification 108. In this way, a software programmer that makes one or more errors (e.g., a typographical error or an error due to not understanding the workings of the software system 136) may have the errors automatically corrected. In addition, the IUI 106 automatically converts the specification (and/or the modified specification) 108 to create a system interface with API calls, reducing or eliminating the manual process of manually checking the specification 108 and manually creating the system interface.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    determining, by one or more processors, a specification associated with a software module that is to be integrated with a software system, wherein the specification comprises at least one of: a data integration specification, a file transfer specification, a message queue specification, and a database specification, and wherein the specification identifies at least one corresponding interaction comprising: a data integration interaction, a file transfer interaction, a message queuing interaction, and a database interaction between the software module and the software system;
    performing, by a machine learning module being executed by the one or more processors, an analysis of the specification;
    modifying, by the one or more processors, at least one portion of the specification to create a modified specification; and
    converting, by the one or more processors, the modified specification to one or more application programming interface (API) calls; and
    providing, by the one or more processors, a system interface to enable the corresponding interaction between the software module and the software system, the system interface comprising the one or more API calls.

2. The method of claim 1, wherein determining the specification associated with the software module comprises at least one of:
displaying a plurality of fields to be filled in;
asking a plurality of questions and receiving a corresponding answer for each question of the plurality of questions; or
retrieving a specification document.

3. The method of claim 1, further comprising:
determining that the at least one portion of the specification is under-provisioned and modifying the specification by increasing a provisioning of a resource.

4. The method of claim 1, further comprising:
determining that the at least one portion of the specification is over-provisioned and modifying the specification by reducing a provisioning of a resource.

5. The method of claim 1, further comprising:
providing, based on the analysis, at least one suggestion to modify a second portion of the specification.

6. The method of claim 1, wherein the one or more API calls comprise at least one call to:
a data integration API;
a file transfer API;
a message queue API; or
a database API.

7. The method of claim 1, further comprising:
determining a predicted value for the at least one portion of the specification;
determining that a specified value in the specification differs from the value by more than a predetermined percentage; and
modifying the specified value in the specification to the predicted value to create the modified specification.

8. A computing device comprising:
one or more processors;
one or more non-transitory computer-readable storage media to store instructions executable by the one or more processors to perform operations comprising:
determining a specification associated with a software module that is to be integrated with a software system, wherein the specification comprises at least one of: a data integration specification, a file transfer specification, a message queue specification, and a database specification, and wherein the specification identifies at least one corresponding interaction comprising: a data integration interaction, a file transfer interaction, a message queuing interaction, and a database interaction between the software module and the software system;
performing, by a machine learning module, an analysis of the specification;
modifying at least one portion of the specification to create a modified specification; and
converting the modified specification to one or more application programming interface (API) calls; and
providing a system interface to enable the corresponding interaction between the software module and the software system, the system interface comprising the one or more API calls.

9. The computing device of claim 8, wherein determining the specification associated with the software module comprises at least one of:
displaying a plurality of fields to be filled in;
asking a plurality of questions and receiving a corresponding answer for each question of the plurality of questions; or
retrieving a specification document.

10. The computing device of claim 8, further comprising:
determining that the at least one portion of the specification is under-provisioned and modifying the specification by increasing a provisioning of a resource.

11. The computing device of claim 8, further comprising:
determining that the at least one portion of the specification is over-provisioned and modifying the specification by reducing a provisioning of a resource.

12. The computing device of claim 8, further comprising:
providing, based on the analysis, at least one suggestion to modify a second portion of the specification.

13. The computing device of claim 8, wherein the one or more API calls comprise at least one call to:
a data integration API;
a file transfer API;
a message queue API; or
a database API.

14. The computing device of claim 8, further comprising:
determining a predicted value for the at least one portion of the specification;
determining that a specified value in the specification differs from the value by more than a predetermined percentage; and
modifying the specified value in the specification to the predicted value to create the modified specification.

15. One or more non-transitory computer readable media storing instructions executable by one or more processors to perform operations comprising:
determining a specification associated with a software module that is to be integrated with a software system, wherein the specification comprises at least one of: a data integration specification, a file transfer specification, a message queue specification, and a database specification, and wherein the specification identifies at least one corresponding interaction comprising: a data integration interaction, a file transfer interaction, a message queuing interaction, and a database interaction between the next software module and the software system;
performing, by a machine learning module, an analysis of the specification;
modifying at least one portion of the specification to create a modified specification; and
converting the modified specification to one or more application programming interface (API) calls; and
providing a system interface to enable the corresponding interaction between the software module and the software system, the system interface comprising the one or more API calls.

16. The one or more non-transitory computer readable media of claim 15, wherein determining the specification associated with the software module comprises at least one of:
displaying a plurality of fields to be filled in;
asking a plurality of questions and receiving a corresponding answer for each question of the plurality of questions; or
retrieving a specification document.

17. The one or more non-transitory computer readable media of claim 15, further comprising:
 determining that the at least one portion of the specification is under-provisioned and modifying the specification by increasing a provisioning of a resource.

18. The one or more non-transitory computer readable media of claim 15, further comprising:
 determining that the at least one portion of the specification is over-provisioned and modifying the specification by reducing a provisioning of a resource.

19. The one or more non-transitory computer readable media of claim 15, further comprising:
 providing, based on the analysis, at least one suggestion to modify a second portion of the specification.

20. The one or more non-transitory computer readable media of claim 15, wherein the one or more API calls comprise at least one call to:
 a data integration API;
 a file transfer API;
 a message queue API; or
 a database API.

\* \* \* \* \*